United States Patent
Beesley et al.

[15] 3,679,959
[45] July 25, 1972

[54] HIGH CURRENT LOW VOLTAGE REGULATED POWER SUPPLY

[72] Inventors: James P. Beesley, Kingston; John B. Gunn, Mount Kisco, both of N.Y.

[73] Assignee: International Business Machines Corporation, Armonk, N.Y.

[22] Filed: Dec. 31, 1970

[21] Appl. No.: 103,245

[52] U.S. Cl. .................................. 321/47, 321/5, 321/18
[51] Int. Cl. ............................................. H02m 7/12
[58] Field of Search ................................. 321/5, 18, 47

[56] References Cited

UNITED STATES PATENTS

| | | |
|---|---|---|
| 3,134,068 | 5/1964 | Feltman..........................321/5 X |
| 2,693,568 | 11/1954 | Chase..............................106/50 |
| 2,953,738 | 9/1960 | Bright................................321/47 |
| 3,083,328 | 3/1963 | Mallery et al..................321/47 X |

Primary Examiner—William M. Shoop, Jr.
Attorney—Hanifin and Jancin and John A. Jordan

[57] ABSTRACT

A polyphase source of alternating current is converted to a low voltage high current regulated d.c. in a manner to conserve power and reduce costs by reduction of the number of components required therefor. To achieve this end, a single transistor is employed for each phase of the polyphase input transformer secondary winding configuration which transistor acts to perform the dual function of providing both rectification and regulation of the a.c. input.

20 Claims, 6 Drawing Figures

INVENTORS
JAMES P. BEESLEY
JOHN B. GUNN
BY John A. Jordan
ATTORNEY

HIGH CURRENT LOW VOLTAGE REGULATED POWER SUPPLY

BACKGROUND OF THE INVENTION

1. Field of Invention

The present invention relates to a system for converting polyphase alternating current input to a regulated direct current output and more particularly to an improved system for converting polyphase alternating current input to a low voltage regulated direct current output.

2. Prior Art

A variety of techniques and arrangements are known in the prior art to achieve rectification and regulation. One common approach, for example, involves employing a diode bridge arrangement as the rectification stage and a series transistor arrangement as a variable impedance regulation stage, whereby the amount of current passing between the rectifier stage and load is controlled in response to variations in the output voltage. Another approach for polyphase conversion of alternating current to a regulated direct current output involves employing triggering devices, such as thyratrons or SCR's, whereby the firing angle of the triggering devices is controlled, in accordance with variations in the output voltage, so that regulation is achieved by controlling the phase angle at which the triggering devices are rendered conductive, during selected portions of the a.c. cycle, to thereby control the average current passing to the load. Exemplary of such an arrangement is that described in U.S. Pat. No. 3,134,068 to S. W. Feltman.

The difficulty with the first of the described conventional arrangements, whereby a separate rectification and regulation stage are emPloyed, resides in the fact that such an arrangement is relatively expensive to fabricate, due to the unnecessary use of rectifier diodes, and is relatively expensive to operate, due to the unnecessary and wasteful loss of power. The difficulty with arrangements similar to those of the above-cited Feltman patent resides in the fact that they are expensive and difficult to fabricate because of the nature of the required triggering devices and because of the complex control circuitry required therefor.

The U.S. Pat. No. 2,693,568 to F. H. Chase, likewise, is exemplary of a prior art arrangement for converting an a.c. input to a regulated d.c. output. The difficulty with arrangements akin to the Chase arrangement resides in the fact that the transistor circuit configuration arrangement constrains its application to conversion of a single-phase input. Accordingly, the converted output from arrangements akin to the Chase circuit exhibit a large ripple voltage necessitating the use of reactance means, such as capacitance, to smooth the d.c. output therefrom. Moreover, in arrangements akin to the Chase arrangement d.c. power sources are required to operate the transistors.

SUMMARY OF THE INVENTION

In accordance with principles of the present invention, the prior art problems and difficulties in achieving a highly effective and economic conversion circuit for converting a.c. input power to regulated d.c. output power, exhibiting little voltage ripple and power loss, is achieved by employing a polyphase conversion system whereby both the rectifying functions required for a.c.-to-d.c. conversion, and the controllable impedance function required for regulation, are combined in each of several devices connected between the polyphase input and a load. More specifically, in accordance with the present invention, a polyphase input is coupled to the emitters of a group of transistors while each of the individual collectors and bases of these transistors are connected in common. The commonly connected collectors are coupled to the output load and the output power delivered thereto is coupled, through error sensing and amplifier means, to the commonly connected bases of the transistors to provide a control signal for the regulation function.

It is, therefore, an object of the present invention to provide an improved conversion system for converting a.c. input power to a d.c. output power.

It is a further object of the present invention to provide a conversion system for converting polyphase a.c. input power to regulated d.c. output power.

It is yet a further object of the present invention to provide a power conversion circuit which is economical and which provides little power loss.

It is yet still a further object of the present invention to provide an economic and highly effective conversion circuit for converting a polyphase input to a regulated d.c. output which exhibits little voltage ripple and obviates unnecessary power loss.

It is yet still another further object of the present invention to provide an efficient and economic voltage conversion circuit for converting a polyphase input source to a regulated d.c. output by employing a single transistor for each phase whereby the emitter-base junction of the transistor acts to provide rectification of the polyphase a.c. input while the emitter-collector path controlled by the base electrode, acts to provide regulation of the d.c. output.

The foregoing and other objects, features and advantages of the invention will be apparent from the following more particicular description of preferred embodiments of the invention, as illustrated in the accompanying drawings.

DESCRIPTION OF THE PREFERRED EMBODIMENTS

Figure 1:
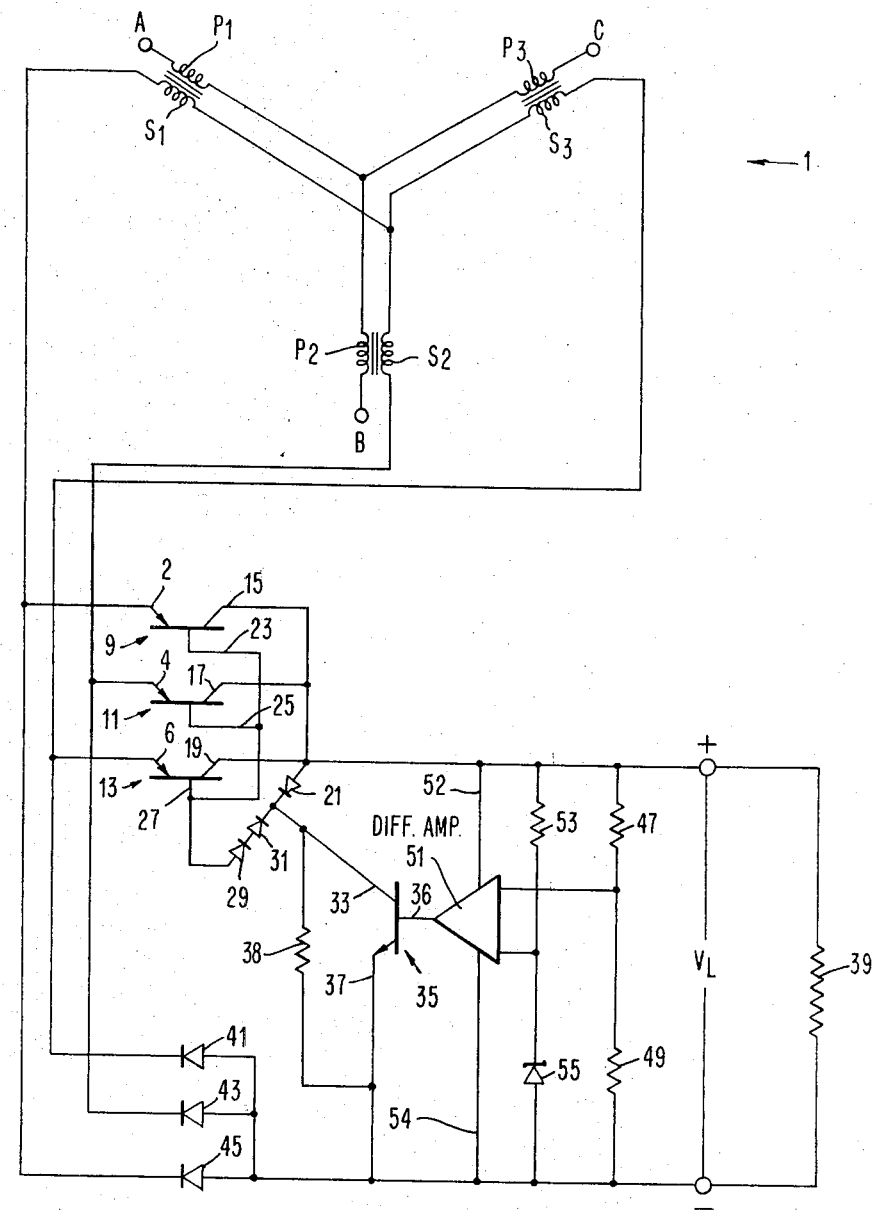
FIG. 1 illustrates a preferred embodiment, in accordance with the principles of the present invention, whereby a three-phase Y primary arrangement is coupled to a three-panel Y secondary arrangement to provide a three-phase input which undergoes full wave rectification.

In the embodiment illustrated in FIG. 1, there is shown a conventional three-phase Y-connected primary transformer configuration wherein the primaries are designated P1, P2 and P3. It is clear that a three-phase source for the primary input may typically be provided by conventional three-phase power such as that commercially available. In this regard, in the arrangement of FIG. 1, as well as the arrangement of FIG. 3, it is to be understood that a three-phase Δ-connected primary configuration may be used in place of the three-phase primary Y-connection.

In the arrangement of FIG. 1, primary windings $P_1$, $P_2$ and $P_3$ are shown respectively coupled to conventional three-phase Y-connected secondaries $S_1$, $S_2$ and $S_3$. The secondary windings $S_1$, $S_2$ and $S_3$ are shown coupled to the respective emitters 2, 4 and 6 of P-N-P transistors 9, 11 and 13, which transistors are utilized as variable-impedance rectifying elements in the circuit. It is clear, in this regard, that N-P-N transistors can likewise be used with corresponding appropriate polarity changes being made in the remainder of the circuit, where required. The respective collectors 15, 17 and 19 are connected in common to the positive side of load 39. The respective bases 23, 25 and 27 are also connected in common and receive a drive current signal from the collector 33 of transistor 35. Diodes 21, 29 and 31 act to prevent forward biasing of the collector-base junctions of transistors 9, 11 and 13 under certain operating conditions, to be explained more fully hereinafter. Transistor 35 has its emitter 37 connected to the negative side of load 39, and its base 36 connected to the output of differential amplifier 51, the latter in turn receiving as its input signal the difference between the voltage on voltage reference diode 55 and that fraction of the output voltage appearing at the junction of resistors 47 and 49, which form a resistive voltage divider across load 39. Differential amplifier 51 has its positive and negative power supply terminals, 52 and 54, respectively, connected to the respective sides of load 39. Diodes 41, 43 and 45 complete the three-phase bridge rectifier circuit, of which the emitter-base junctions of transistors 9, 11 and 13 form part.

It should be noted in regard to the diodes 29 and 31 that rather than employ a single set of diodes, as shown in FIG. 1, between the commonly connected bases 23, 25 and 27 of the respective transistors 9, 11 and 13 and the cathode of diode 21, a pair of diodes may, alternatively, be employed in each base circuit so that between each of the bases 23, 25 and 27 and the cathode of diode 21, a pair of diodes would be connected.

In order that the circuit may start up correctly, when the a.c. input is first applied, a resistor 38 may be connected between the emitter 37 and collector 33 of transistor 35. The resistance of this resistor is chosen so that it supplies just enough drive current to the bases of transistors 9, 11 and 13 to ensure that differential amplifier 51 can deliver a small current to the base 36 of transistor 35, even in the absence of current through collector 33 of transistor 35.

Figure 2A:
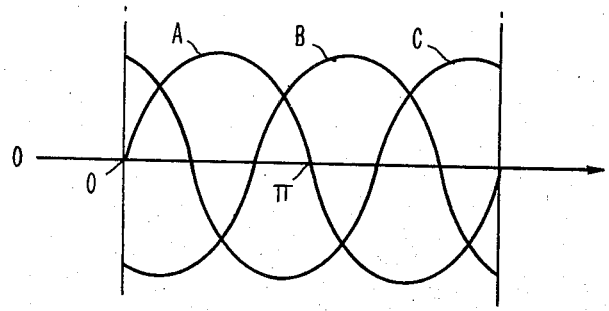
FIGS. 2a and 2b depict input and output waveforms, respectively, to be used in the description of FIG. 1.
Figure 2B:
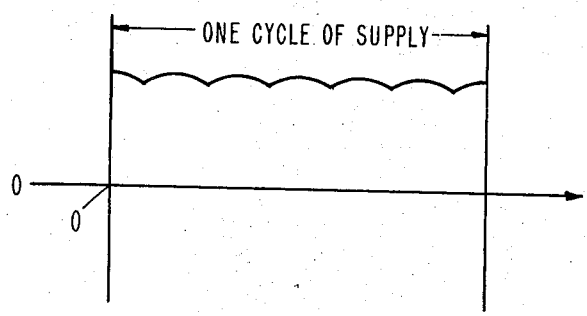

The operation of the arrangement of FIG. 1 can best be described by reference to the waveforms shown in FIGS. 2a and 2b. Assuming, for purposes of explanation, that the waveform passing through 0 volts at 0° is the A phase, as shown in FIG. 2a, then, the B phase is shown as passing through 0 volts at 120° and the C phase is shown passing through 0 volts at 240°. In FIG. 2a, it can be seen that at 30° the A phase becomes more positive than the C phase. If it is further assumed that a certain current signal is being delivered by transistor 35 to the common base connection of transistors 9, 11 and 13, then at the 30° point transistor 9, shown in FIG. 1 coupled to the A phase, secondary $S_1$, commences to conduct while at the same time transistor 13, coupled to the C phase secondary $S_3$ and previously conductive, terminates conduction. During this time, it can be seen, from FIG. 2a, that the B phase is the most negative phase and, accordingly, diode 43, being coupled to the B phase secondary $S_2$, is also conducting. As the A phase increases in magnitude approaching 90°, transistor 9 and diode 43 continue to conduct. At 90° it can be seen, with reference to FIG. 2a, that the C phase crosses the B phase and commences to become more negative. At this crossover point diode 43 terminates conduction and diode 41 commences to conduct. Thereafter, transistor 9 and diode 41 coincidentally continue to conduct until the A phase crosses the B phase at 150°. At this juncture transistor 9 terminates conduction and transistor 11 commences to conduct. Thereafter, transistor 11 coincidentally conducts with diode 41 until the A phase crOsses the C phase in the negative direction at 210° whereby the A phase commences to become more negative than the C phase. At this juncture diode 45 commences to conduct coincidentally with transistor 11. At 270°, the C phase becomes more positive than the B phase whereby transistor 11 terminates conduction and transistor 13 commences to conduct coincidentally with diode 45 until the B phase crosses the A phase, in negative region, at 330°. At this juncture the B phase becomes more negative than the A phase and accordingly diode 43 commences to conduct.

It can be seen from the above description, that the transistors 9, 11 and 13, respectively associated with each of the three phases A, B and C, are each conductive over a 120° interval of one cycle of supply. Thus, at all times, the output current is flowing through a transistor, which can be utilized for regulation purposes. Thus, no energy storage element (capacitor or inductor) is needed to maintain a continuous output, on contradistinction to systems where the current through the control elements is interrupted from time to time. On the other hand, diOdes 45, 43 and 41, respectively associated with each of the three phases A, B and C are each conductive over a 120° interval of one cycle of supply but their conductive intervals are shifted 60° from the corresponding conductive intervals of the associated transistors. As a result of this operation fullwave rectification is obtained, whereby the output voltage waveform, as shown in FIG. 2b, exhibits six ripples over one cycle of supply. However, because the transistors and diodes do not conduct in phase, the peaks of the six output ripples are shifted 30° from the positive peaks which act to render the respective transistors conductive.

It can be seen, with reference to FIGS. 1 and 2, that each of the tranSistors 9, 11 and 13 operate to conduct over 120° of one cycle of supply. Thus, for example, when transistor 9 is to conduct during the 120° interval when the A phase is most positive, as heretofore described, transiStors 11 and 13 normally do not conduct because both their collector and emitter junctions are reverse-biased. However, under some conditions of operation the input a.c. voltage may become sufficiently low that the circuit cannot deliver to load 39 the regulated value of the output voltage without transistor 9, for example, becoming saturated during part, or all, of its conduction time. This condition in itself does no harm, but since saturation implies forward biasing of its collector-base junction, and since the other transistors 11 and 13, for example, have their bases and collectors connected in common with transistor 9, then their collector-base junctions will also be forward biased. Since, at this time, the emitter-base junctions of transistors 11 and 13 are reverse-biased, then these transistors will operate in an inverted mode, and destructively large emitter reverse currents may flow in them.

To avoid the latter possibility, it is necessary to prevent the common base connection of transistors 9, 11 and 13 from becoming significantly negative with respect to their common collector connection. This can ordinarily be achieved by connecting a single diode 21 between the respective common base and common collector connections, which then prevents the collector junctions from becoming sufficiently forward biased to conduct. With some combinations of diode 21 and transistors 9, 11 and 13, however, the limitation on forward collector bias provided in this way, may not be sufficient, and in that case, one or more diodes may be connected in series with the common base connection to provide an additional voltage drop. In FIG. 1, two such diodes 29 and 31 are shown, but it should be understood that their inclusion is not always necessary, and has the disadvantage of increasing the power dissipations in the transistors 9, 11 and 13, bY increasing the minimum difference between the input and output voltages at which the circuit can maintain regulation.

It should be noted that the transistors employed for purposes of effecting rectification and regulation, in accordance with the present invention, operate as regulators with the collector-base junction reverse-biased, with operation in the saturation region being avoided. As rectifiers, they operate to block reverse current flow by having their emitter-base junctions reverse biased.

It should be clear that regulation is achieved by negative feedback, in a conventional way, utilizing a control signal obtained via differential Amplifier 51. Zener diode 55 provides a fixed reference voltage to which the output voltage may be compared. When the output voltage obtained from the junction of resistors 47 and 49 drops below the zener breakdown voltage of zener diode 55, the output voltage of differential amplifier 51 increases to cause the collector 33-emitter 37 path of transistor 35 to become more conductive. This acts to provide a lower base circuit impedance for the particular one of the transistors 9, 11 and 13 that may be conductive at that particular time. Thus, if transistor 9 is conducting, more base circuit current is allowed to flow, because of the reduced impedance provided by transistor 35, and accordingly the emitter-collector path of transistor 9 becomes more conductive, thereby allowing more current to flow to the output circuit. If, on the other hand, the output voltage increases above the level of regulation differential amplifier 51 causes transistor 35 to become less conductive thereby reducing the amount of base current from transistor 9 that is allowed to flow. In response thereto the emitter-collector impedance path of transistor 9 reduces the amount of current that is allowed to flow to the output circuit. This negative feedback action thus tends to maintain the output voltage constant, despite variations in input and load.

It is clear, however, that other modes of regulation may be employed; for example the current in the output circuit may be sensed by passing it through a small series resistor, and comparing the resulting voltage with a reference by means of the differential amplifier. In this way, the output current rather than voltage, is maintained constant. Alternatively, the load might be a d.c. motor, and a signal from a tachometer generator used as the feedback signal, to achieve constant-speed operation of the motor. Of course, the reference voltage in any of these schemes need not be constant, but may be varied to cause the output to vary correspondingly.

Figure 3:
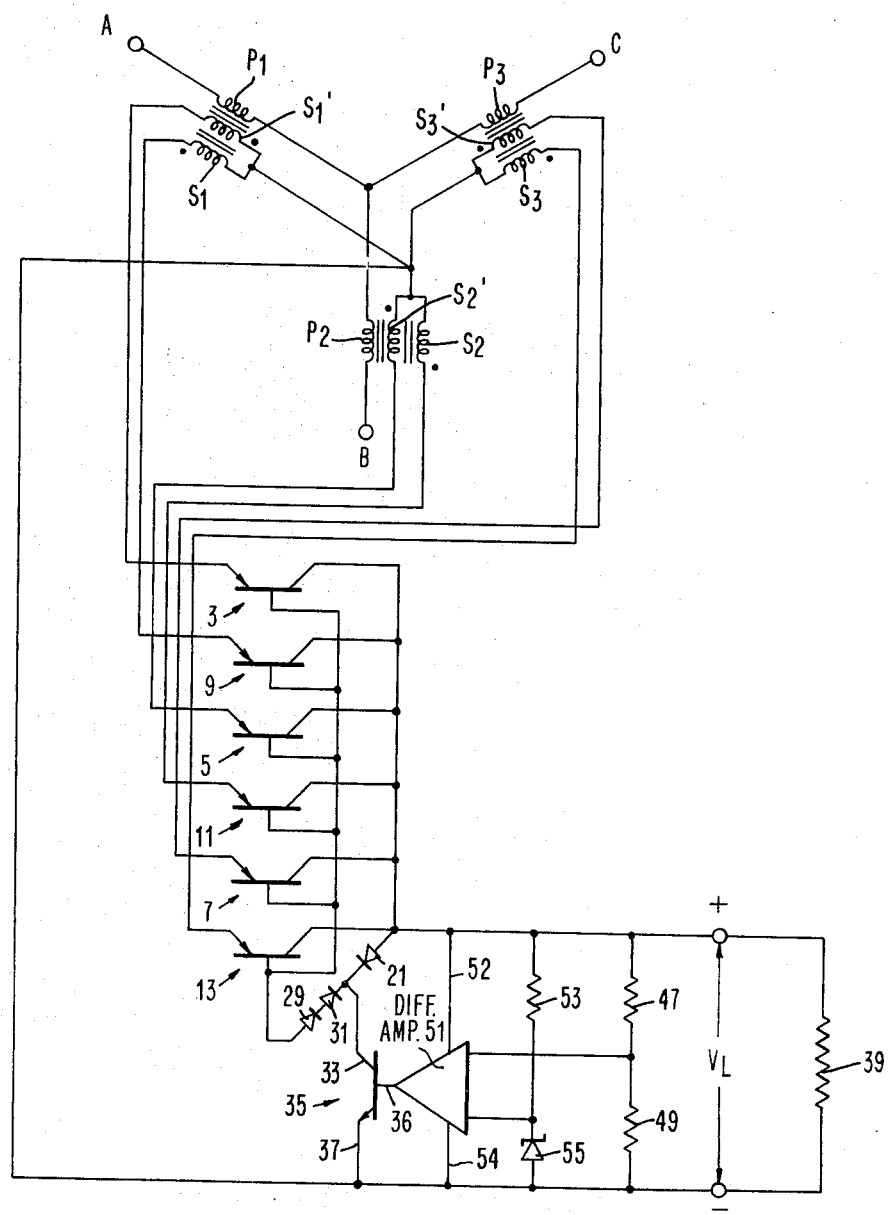
FIG. 3 shows another preferred embodiment, in accordance with the principles of the present invention, whereby a three-phase Y input arrangement is coupled to a six-phase star secondary arrangement whereby a six-phase input is provided.

In the embodiment shown in FIG. 3, rather than employ a three-phase bridge rectifier arrangement, a six-phase star secondary scheme is employed. It can be seen from FIG. 3 that like reference characters have been employed to designate the like elements of FIG. 1. In the arrangement of FIG. 3 six transistors, designated 3, 5, 7, 9, 11 and 13, are employed, one corresponding to each of the six phases provided by the six-phase star secondary arrangement. The transistors shown in FIG. 3 operate in a manner akin to those of FIG. 1. However, since there are six transistors, one corresponding to each of the six phases provided by the six-phase star secondary arrangement, each transistor is conductive over a 60° interval of one cycle of supply. The operation of the six transistors of FIG. 3 can be explained more clearly by reference to the waveforms shown in FIGS. 4a and 4b.

Figure 4A:
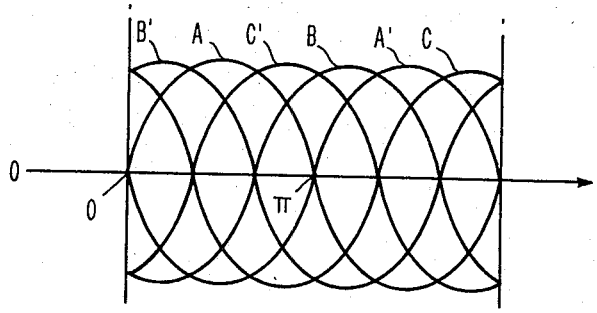
FIGS. 4a and 4b depict input and output waveforms, respectively, to be used in the description of FIG. 3.

With reference to FIG. 4a there is shown the six phases provided by the six-phase star secondary input arrangement. The A phase is designated in a manner akin to that described with reference to FIG. 2a wherein its amplitude is given as 0 volts at 0°. The B phase is shown 120° from the A phase and the C phase is shown 240° from the A phase. The phases designated A', B', and C' correspond to phases 180° out from the respective A, B and C phases. In accordance with the arrangement of FIG. 3, the transistor whose emitter is most positive is conductive. Thus, with reference again to FIG. 4a, it can be seen that between 0° and 60° the B' phase is most positive. This phase corresponds to the signal received on secondary designated $S_2'$, shown in FIG. 3. Accordingly, transistor 5, coupled by its emitter to secondary $S_2'$ is conductive during this 60° interval. Continuing with FIG. 4a, when the magnitude of the B' phase voltage is equal to the A phase voltage, transistor 5 cuts off and transistor 9 commences to conduct. Transistor 9 conducts over the interval from 60° to 120° whereupon transistor 9 cuts off and transistor 7 commences to conduct, since the C' phase is now more positive than the A phase. In the same way, each transistor 11, 3, and 13 conducts in sequence as its emitter becomes the most positive. It thus can be seen that each of the six transistors conducts over a 60° interval of one cycle of supply.

Figure 4B:
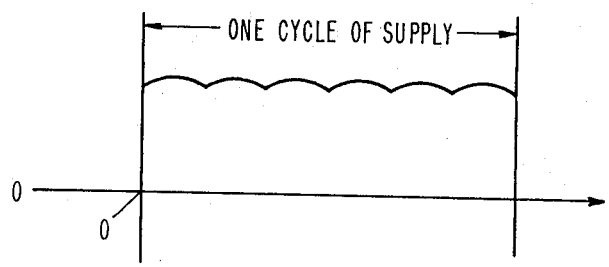

FIG. 4b shows the output voltage obtained from an arrangement such as that shown in FIG. 3. The output voltage is characterized by six ripples. The peaks of the ripples in the output voltage obtained by the arrangement of FIG. 3 are, contrary to the arrangement of FIG. 1, in-phase with the positive peaks of the a.c. input voltage which cause the respective transistors to conduct. It is thus clear that in FIG. 1 a three-phase input is rectified to provide a relatively constant output voltage while in FIG. 3 a six-phase input is employed to achieve the same end.

In each of the circuits of FIGS. 1 and 3 the transistor arrangements are employed, in a dual purpose manner, as both a means of providing rectification and a means of providing regulation of a polyphase input. Such an arrangement acts to minimize power loss and cost of fabrication by minimizing the number of elements required to provide a relatively stable and constant d.c. voltage from an a.c. input source.

There exist in the prior art many different rectification circuits for converting polyphase a.c. to d.c. Exemplary of the types of rectification circuits that exist are those described by Robert Wells in his book entitled "Silicon and Germanium Power Rectifier Technology," 1966, Sir Isacc Pitman and Sons Ltd. It is clear, however, that the Wells' treatment is not exhaustive. In all of these prior circuits a small group of diodes can be identified, such that, at any time a diode through which the output current is flowing can be found within the group; the number of diode in the group may be equal to the total number of diodes, or to the number of input phases, or it may be less than either of these. In any case, the present invention may be applied to such a circuit by replacing the diodes within the group by rectifying elements of variable impedance (such as transistors) to which a control signal is applied to effect output regulation.

For example, in the six phase scheme described on page 47 of the above cited Wells' text, one set of three diodes, of the six diodes, could be replaced by rectifying elements of variable impedance, in accordance with the present invention, whereby six secondary phases would exist but only three rectifying elements of variable impedance would be needed. Such an arrangement could essentially be obtained in FIG. 1 of the present invention by connecting the anodes of the respective diodes 41, 43, and 45 to the respective windings $S_1'$, $S_2'$, and $S_3'$, of another three-phase star or Y-connected set of secondary windings, with the common of said secondary windings being connected to the negative terminal of load 39.

While the invention has been particularly shown and described with reference to preferred embodiments thereof, it will be understood by those skilled in the art that various changes in form and details may be made therein without departing from the spirit and scope of the invention.

What is claimed is:

1. A voltage conversion circuit for converting a poly-phase alternating current input to a regulated direct current output voltage, comprising:

input means for providing a plurality of phases of an alternating input signal;

output impedance means coupled between a pair of output terminals;

a plurality of transistor means corresponding in number to the number of phases of said input means with each transistor means arranged so that the individual emitter-collector electrode paths thereof are coupled between respective ones of the said phases of said input means and one of said pair of output terminals so that the respective electrodes commonly coupled to the said one of said pair of output terminals act to perform a collector function and the respective electrodes coupled to the said respective ones of said phases act to perform an emitter function, and with the respective base electrodes thereof commonly connected to one another controllable impedance means having a control means and a controllable impedance path between first and secod terminals with said impedance path controllable in response to a signal on said control means and with said first and second terminals coupled respectively between said commonly connected base electrodes and the other of said pair of output terminals so as to thereby vary the current flow through said base electrodes in response to said signal on said control means; and means coupling the said control means of said controllable impedance means to said output impedance means for providing an error signal to said control means and coupling the said second terminal of said controllable impedance means to said input means so as to cause the transistor means having the most positive phase on the electrode thereof coupled thereto to perform the said emitter function therefor to become conductive so that the junction between the said electrode to perform the said emitter function therefor and the base electrode thereof is forward biased while the corresponding junctions of the remainder of said plurality of transistor means which are non-conducting are reversed biased and the junction between the electrode thereof to perform the said collector function therefor of the said conductive transistor means and the said base electrode is reversed-biased, whereby rectification is obtained via the said corresponding reverse biased junctions of the said remainder of transistor means which are non-conducting and regulation is obtained through control of the said reverse biased junction of the said conductive transistor meansin response to said controllable impedance means.

2. The circuit as set forth in claim 1 wherein said number of phases and number of transistors is six.

3. The circuit as set forth in claim 1 wherein said number of phases and number of transistors is three.

4. The circuit as set forth in claim 3 wherein the said means coupling the said second terminal of said controllable impedance means acts to couple the said second terminal to each of the respective ones of said plurality of phases of said alternating input means via respective diode means to thereby provide full wave rectification.

5. The circuit as set forth in claim 1 wherein first diode means are coupled between the said electrodes commonly coupled to the said one of said pair of output terminals and the said first terminal of said controllable impedance means and second diode means are coupled between the said first terminal of said controllable impedance means and said commonly connected base electrodes.

6. The circuit as set forth in claim 5 wherein said plurality of phases comprises three phases and said input means includes transformer means having a three-phase primary winding arrangement coupled to the respective ones of said three phases and at least a three-phase secondary winding arrangement with respective ones of the windings of said secondary winding arrangement being individually connected to the respective said electrodes to perform the said emitter function of said plurality of transistor means, with the number of said plurality of transistor means corresponding to the number of secondary windings.

7. The circuit as set forth in claim 1 wherein said commonly connected base electrodes are connected to the said commonly coupled electrodes to perform said collector function by an anti-saturation diode.

8. A voltage conversion circuit for converting a polyphase alternating current input to a regulated direct current output voltage comprising;
a plurality of transistors corresponding in number to the number of phases of said polyphase input with each transistor arranged so that the individual emitter-collector paths thereof are connected between respective ones of the said phases of said input and output circuit to thereby allow the respective transistor electrodes connected to the respective ones of said phases of said input to perform an emitter function and provide a rectifying path of controllable impedance to effect unidirectional current flow between said input and said output circuit to thereby produce a direct current output voltage thereat;
current driving means connected to the base electrode of each of the respective transistors to thereby effect control of the impedance of each of said rectifying paths;
means coupling voltage variations in said output voltage to said current driving means to vary the respective impedances of said rectifying paths in response to said variations to thereby regulate said output voltage; and
diode means connected between said output circuit and said base electrodes.

9. The circuit as set forth in claim 8 wherein said diode means are connected between said output circuit and said current driving means.

10. The circuit as set forth in claim 9 further including a pair of series-connected diodes means connected between said base electrodes and said current driving means.

11. A voltage conversion circuit for converting a polyphase alternating current input to a regulated direct current output voltage, comprising:
a plurality of transistors corresponding in number to the number of phases of said polyphase input with each transistor arranged so that the individual emitter-collector paths thereof are connected between respective ones of the said phase of said input and an output circuit to thereby allow the respective transistor electrodes connected to the respective ones of said phases of said input to perform an emitter function and provide a rectifying path of controllable impedance to effect unidirectional current flow between said input and said output circuit to thereby produce a direct current output voltage at the collector electrodes thereof commonly connected to one another at said output circuit;
current driving means coupled by a first diode to the said commonly connected collector electrodes and by a second diode to a node to which each of the base electrodes of the respective transistors of said plurality of transistors are commonly connected to thereby allow control of the impedance of each of said rectifying paths; and
means coupling voltage variations in said output voltage to said current driving means to vary the respective impedances of said rectifying paths in response to said variations to thereby regulate said output voltage.

12. The circuit as set forth in claim 11 wherein said diode means comprise a pair of series-connected diodes.

13. A voltage conversion circuit for converting a polyphase alternating current input to a regulated direct current output voltage, comprising:
a plurality of transistors corresponding in number to the number of phases of phases of said polyphase input with each transistor having its emitter connected to a respective phase of said polyphase input, its base connected to a common node with the bases of the other of said transistors and its collector connected in common with the collectors of the other of said transistors to an output circuit to provide a rectifying path of controllable impedance between each of said input phases and said output circuit;
current driving means connected by first diode means to the said common node of the said bases of each of said transistors and by second diode means to the said commonly connected collectors so as to effect control of the impedance of each of said rectifying paths; and
error-sensing means to detect variations from prescribed conditions in said output circuit to vary the impedances of said rectifying paths to maintain said prescribed conditions.

14. A power supply for developing a regulated direct current signal from a source of unregulated three-phase alternating current signals, comprising:
transformer means including a three-phase primary winding arrangement coupled to said source and at least a three-phase secondary winding arrangement associated with said primary winding arrangemet;
output impedance means coupled between a pair of output terminals;
a plurality of transistor means corresponding in number to the number of phases of said secondary winding arrangement with the respective emitter electrodes of said plurality of transistor means coupled to the respective phase windings of said secondary winding arrangement and with the respective collector electrodes of said plurality of transistor means commonly connected to one another at one of said pair of output terminals and with the respective base electrodes of said plurality of transistor means commonly connected to one another;
controllable impedance means having a control means and a controllable impedance path between first and second terminals with said impedance path controllable in response to a signal on said control means and with said first and second terminals coupled respectively between said commonly connected base electrodes and the other of said pair of output terminals so as to thereby vary the current flow through said base electrodes in response to said signal on said control mean; and means coupling the said control means of said controllable impedance means to said output impedance means for providing an error signal to said control means and coupling the said second terminal of said controllable impedance means to the said secondary winding arrangement of said transformer means so as to cause the transistor means having the most positive phase potential on the emitter electrode thereof coupled thereto to become conductive so that the junction between the said emitter electrode and base electrode thereof is forward biased while the corresponding junctions of the remainder of said plurality of transistor means which are non-conducting are reversed biased and so that the junction between the said collector electrode therefor of the said conducting transistor means and the said base electrode is reverse biased whereby rectification is obtained via the said corresponding reverse biased junctions of the said remainder of transistor means which are non-conducting and regulation is obtained via the said reverse biased junction of said conductive transistor means in response to said controllable impedance means.

15. A circuit as set forth in claim 14 wherein the said at least three-phase secondary winding arrangement comprises three secondary windings to provide three-phase alternating current and wherein said plurality of transistors comprises three transistors the individual emitters of which are directly coupled to the respective secondary windings of said three secondary windings and the individual collectors of which are directly connected in common to the said one terminal of said pair of output terminals, said secondary windings acting to provide alternating current signals 120° apart which signals act to render the respective transistors conductive over the 120° intervals when the signals are most positive.

16. The circuit as set forth in claim 15 wherein the said means coupling the said second terminal of said cotrollable impedance means to the said secondary winding arrangement includes individual diode means coupled between each of the respective secondary windings of said three secondary windings and the said second terminal of said controllable impedance means to thereby provide full wave rectification of said three-phase alternating current.

17. The circuit as set forth in claim 14 further including diode means coupled between the said commonly connected collector electrodes and the said commonly connected base electrodes of said plurality of transistor means to thereby prevent reverse current flow through said transistor means from said output impedance means.

18. A power supply for developing a regulated direct current signal from a source of unregulated three-phase alternating current signals, comprising:

transformer means including a three phase primary winding arrangement coupled to said source and a six-phase star secondary winding arrangement associated with said primary winding arrangement;

output circuit means;

six transistors the individual emitters of which are coupled to the respective six secondary windings of said six-phase star secondary winding arrangement and the individual collectors of which are connected in common to said output circuit means, said six-phase star secondary winding arrangement acting to provide alternating current signals 60° apart which signals act to render the respective transistors conductive over the 60° interval when the signals are most positive so as to provide a unidirectional current to said output circuit means the magnitude of which varies in accordance with the magnitude of the base current of said transistors;

current driving means connected to the base electrodes of said transistors so as to vary the base current of said transistors in accordance with variations of the voltage applied to said current driving means from said output circuit; and means connected between said output circuit means and said current driving means so as to vary the base current of said transistor means in accordance with variations in the output voltage across said output circuit means.

19. The circuit as set forth in claim 18 further including diode means coupled between said output circuit means and the bases of said transistors.

20. A voltage conversion circuit for converting a polyphase input signal to a regulated direct current output signal, comprising:

source means for providing a source of unregulated three-phase alternating current signals;

polyphase transformer input means including a three-phase primary winding arrangement coupled to said source means and a three-phase secondary winding arrangement including three secondary windings, one associated with each of the said three phases;

output circuit means including impedance means;

diode means including three diodes with each of the respective diodes having one electrode coupled respectively to individual ones of said three secondary windings and with the other electrode thereof commonly connected to said output circuit means;

a plurality of transistors corresponding in number to the number of said plurality of secondary windings and connected so that the emitters of the respective transistors are respectively coupled to individual ones of said plurality of secondary windings and so that the respective collectors are commonly connected to said output circuit means;

current driving means coupled to each base of the bases of said plurality of transistors by a pair of series-connected diodes so as to thereby vary the base current available to each transistor in accordance with the voltage applied to said current driving means;

means coupled between the said impedance means of said output circuit means and said current driving means to vary the current of said current driving means in accordance with variations in the output voltage developed across the said impedance means so as to thereby vary the base current available to said plurality of transistors in accordance with the said variations in said output voltage; and further diode means coupled between said output circuit means and said current driving means to prevent reverse current flow through said output circuit means to said transformer input means.

* * * * *